United States Patent [19]

Piteo

[11] 4,220,909
[45] Sep. 2, 1980

[54] HALF-WAVE REGULATOR RECTIFIER FOR AN ALTERNATOR

[75] Inventor: Michael J. Piteo, Enfield, Conn.

[73] Assignee: R. E. Phelon Company, East Longmeadow, Mass.

[21] Appl. No.: 686,144

[22] Filed: May 13, 1976

[51] Int. Cl.² .............................................. H02J 7/14
[52] U.S. Cl. ...................................... 322/94; 320/39; 320/59; 320/DIG. 2
[58] Field of Search ..................... 322/89, 90, 95, 94; 320/DIG. 2, 39, 40, DIG. 1, 57, 59

[56] References Cited

U.S. PATENT DOCUMENTS

| | | | |
|---|---|---|---|
| 3,296,515 | 1/1967 | Knauth | 320/24 |
| 3,760,259 | 9/1973 | Tharman | 320/40 X |
| 3,857,082 | 12/1974 | van Opijnen | 320/40 X |
| 4,146,831 | 3/1979 | Farr | 320/39 X |

FOREIGN PATENT DOCUMENTS 1059331  2/1967  United Kingdom .............. 320/DIG. 2

Primary Examiner—Robert J. Hickey
Attorney, Agent, or Firm—McCormick, Paulding & Huber

[57] ABSTRACT

A half-wave regulator rectifier utilizes a silicon controlled rectifier (SCR) as the rectifying element between an alternator producing positive and negative voltage phases or waveforms and a battery charged by the alternator. The SCR is permitted to conduct charging currents through the battery during the positive voltage phases by means of a control circuit having a transistor connected to the control gate of the SCR. The control circuit monitors the alternator voltage and causes the transistor to inhibit conduction through the SCR above a regulated battery voltage unless charging current flows through the battery before the regulated battery voltage is reached by the alternator voltage. The regulator rectifier is protected against damage when abnormal conditions exist, such as no battery connection with the regulated system.

19 Claims, 3 Drawing Figures

BATTERY CHARGING    BATTERY CHARGED

HALF-WAVE REGULATOR RECTIFIER FOR AN ALTERNATOR

BACKGROUND OF THE INVENTION

The present invention relates to regulator rectifiers for use with alternators that charge batteries. More particularly, the invention is related to a half-wave regulator rectifier in which a silicon controlled rectifier serves as the rectifying element between the alternator and battery.

In many prior art regulator rectifiers utilized with alternators to maintain a charge on a battery, regulation at a selected battery voltage level is provided by monitoring the battery voltage itself. If the battery voltage drops below some preselected value, a switching element such as a silicon controlled rectifier (SCR) is rendered conductive to supply a charging current to the battery during the positive phase of the alternator output. U.S. Pat. No. 3,568,037 is typical of such a system.

In prior art systems, difficulties arise in operating electrical loads connected to the battery when abnormal conditions exist, such as reversed battery polarity, no battery connection with the regulated system or inadvertent grounding of the positive pole of the battery. Under such abnormal conditions, damage may result either to the alternator itself or to components in the regulator rectifier or to elements forming the electrical load that normally connects with the battery.

To provide protection for the alternator and other elements in such abnormal conditions, voltage regulator systems have been designed with added circuitry to overcome the special circumstances which arise. U.S. Pat. No. 3,857,082 discloses a relatively complex system which provides interruption or diversion of charging current from the alternator during the abnormal conditions.

In U.S. Pat. No. Re. 27,638 filed by the present inventor, an alternator rectifier and voltage regulator is disclosed which is capable of operating an electrical load without a battery in the system by phase control of the alternator output during each cycle, or rectified half-cycle. The regulator maintains an average value of voltage and current through the electrical load connected with the alternator.

Each of these prior art systems utilizes a control circuit having a transistor for controlling the conduction period of the SCR; however, the circuits are relatively complex and the regulator disclosed in U.S. Pat. No. Re. 27,638 is not designed to maintain a preselected charge in an associated battery.

It is, accordingly, a general object of the present invention to provide a regulator rectifier for controlling the output of an alternator to maintain a preselected charge in a battery without damaging either the alternator, the rectifier or electrical loads connected to the battery in abnormal conditions. More specifically, it is an object of the invention to provide a regulator rectifier which will not be damaged or damage an electrical load connected with the battery when the battery is removed from the circuit.

SUMMARY OF THE INVENTION

The present invention resides in a half-wave regulator rectifier for an alternator producing alternate positive and negative voltage phases or waveforms for charging a battery to a regulated battery voltage.

The regulator rectifier includes a controlled rectifier connected as the rectifying element between one terminal of the alternator and one terminal of the battery. In a preferred embodiment of the invention, the rectifying element is a silicon controlled rectifier having an anode connected to the ground terminal of the battery and a cathode connected to one terminal of the alternator.

Control circuit means are connected to the rectifying element for controlling forward conduction through the element and battery during the positive phase of the alternator output. The circuit means include controlled switching means and an alternator voltage tracking circuit.

The tracking circuit is connected to the alternator terminals and produces a signal tracking the positive voltage waveform in the vicinity of the regulated battery voltage. In a preferred embodiment of the invention, the tracking circuit includes a voltage divider connected across the alternator terminals with a zener diode selected to conduct when the regulated battery is reached.

The controlled switching means is connected to the tracking circuit and is responsive to the tracking signal for operation. The switching means is also connected to the control gate of the rectifying element to permit the element to be conductive when the alternator voltage is above and the battery voltage is below the regulated voltage and to inhibit conduction when the battery voltage is above the regulated voltage. More specifically, conduction of the rectifying element is inhibited unless the alternator current is transmitted through the battery before the alternator voltage reaches the regulated battery voltage level.

In one embodiment of the invention, the controlled switching means is comprised by a transistor having a current-responsive base connected through a resistive element to battery ground. The transistor detects current flow through an electrical load normally connected to the battery and interrupts the alternator output when a number of abnormal battery conditions exist.

In another embodiment of the invention, the controlled switching means comprises a transistor which periodically gates the rectifying element into conduction to provide a time-averaged power output from the alternator when the battery is disconnected.

DESCRIPTION OF THE PREFERRED EMBODIMENTS

Figure 1:
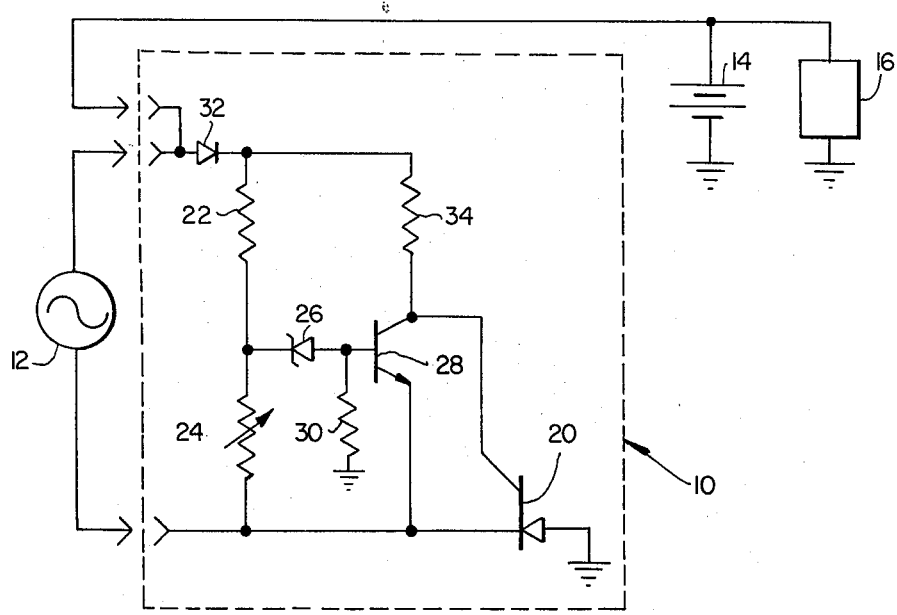
FIG. 1 is an electrical schematic illustrating one embodiment of the regulator rectifier of the present invention.

FIG. 1 illustrates a half-wave regulator rectifier, generally designated 10, of the present invention within the dotted outline. The regulator rectifier is connected between an alternator 12 and a battery 14 which energizes an electrical load 16. A typical environment in which the regulator rectifier 10 is used would be an engine-powered vehicle having a self-contained electrical system with the alternator 12 driven by the engine to charge the battery. The alternator is preferably of the permanent magnet type producing a cyclic output defining alternate positive and negative voltage phases or waveforms. Thus, when the alternator is not charging the battery, the output at the alternator terminals may appear as shown in curve a of FIG. 2. The regulator rectifier 10 controls current flowing from the alternator to the battery and maintains a regulated battery voltage such as, for example, 12 volts. The regulator rectifier 10 may be a single module that can be plugged into the alternator-battery system as illustrated.

The regulator rectifier 10 includes a silicon controlled rectifier (SCR) 20 having an anode connected to battery ground and cathode connected to an alternator terminal to provide half-wave-rectified charging currents through the battery when the battery is below the regulated voltage. During positive voltage phases, (that is when the alternator terminal is connected to the positive terminal of the battery is positive relative to the other alternator terminals), conduction of the SCR 20 is prevented by the control circuit within the regulator unless current from the alternator 12 flows through the battery 14 before the alternator voltage reaches the regulated battery voltage.

The control circuit includes a voltage divider comprised of a fixed resistor 22 and a variable resistor 24 connected in series across the terminals of the alternator 12. Adjustment of the resistor 24 regulates the voltage to which the battery 14 is maintained and if a predetermined voltage level is always desired, the resistor 24 may be appropriately fixed. The output of the voltage divider at the junction of resistors 22 and 24 is connected to a zener diode 26 and the base of a NPN transistor 28. The base of the transistor is also connected through a control resistor 30 to battery ground. The collector of the transistor 28 is tied through a diode 32 and a resistor 34 to the terminal of the alternator 12 connected in common with the positive terminal of the battery 14. The collector is also connected to the control gate of the SCR 20 while the emitter is connected to the cathode of the SCR. With such connections, the transistor 28 serves as a solid state control switch for shunting the gate and cathode of the SCR and operates in response to signals from either the voltage divider and diode 26 or the control resistor 30.

OPERATION IN FIG. 1

During the positive phases of the alternator 12, control current flows through the diode 32 and resistor 34 to the control gate and cathode of SCR 20 to reduce the breakover voltage for forward conduction. At the same time, the voltage divider formed by resistors 22 and 24 serves as a tracking circuit to monitor the output voltage of the alternator 12, and when the output voltage reaches the breakdown voltage of the zener diode 26, current flows through the base of the transistor 28 to the emitter and places the transistor in conduction. Thus, the control current supplied through the resistor 34 for the gate of the SCR 20 is shunted back to the alternator at a preselected alternator voltage determined by the resistors 22 and 24 and the zener diode 26. This preselected voltage is the voltage at which the battery 14 is regulated.

If the battery 14 is discharged below its regulated voltage, the alternator current flows through the battery and the gated SCR 20 before transistor 28 is placed in its conductive state. Therefore, conduction of the transistor 28 to shunt current from the control gate of the SCR to the alternator SCR has no effect upon established conduction through the SCR. Thus, during the positive phases of the alternator output, charging current passes through the discharged battery. During the intervening negative phases, the SCR is reverse biased and stops conducting to prevent discharging of the battery.

When the battery 14 is charged to its regulated voltage level or above, no current from the alternator 12 flows through the battery 14 and SCR 20 before the transistor 28 becomes conductive to shunt the control gate of the SCR. Therefore, the alternator remains electrically disconnected from the battery until the battery voltage again drops below its regulated level.

Figure 2:
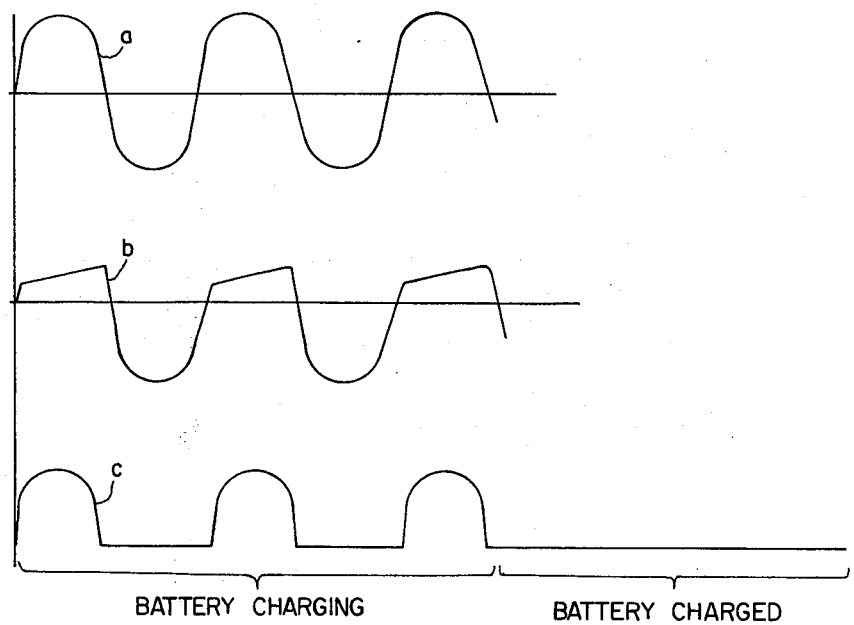
FIG. 2 is a series of waveforms illustrating the various voltages or currents existing within the regulator rectifier of FIG. 1 during different battery conditions.

During positive voltage phases of the alternator when the battery voltage is below the regulated voltage, the battery loads the alternator 12 and the alternator voltage appears as shown in curve b of FIG. 2. Because of the SCR, the charging current through the battery 14 at the same time is half-wave rectified as indicated in curve c of FIG. 2. When the battery is fully charged, the SCR is not conductive during any portion of the alternator output and the battery experiences no charging current as indicated in curve c also.

The control resistor 30 protects the alternator 12, the rectifier 10 and the load 16 against damage during normal battery conditions. For example, if the control resistor were not used and the battery 14 were removed from the circuitry while the alternator 12 and load 16 were operating, the SCR would sustain conduction through the entire positive voltage phase of the alternator and full alternator voltage could be applied to the load. When the alternator begins its positive phase with the resistor 30 in the circuit, however, current flows from the alternator through the load 16 to ground and then through the resistor 30 and base-emitter circuit of the transistor 28 to immediately place the transistor in conduction. The gate current for the SCR 20 is thereby immediately shunted back to the alternator and the SCR is inhibited while still in its nonconductive state. Therefore, the load 16 is protected from the high output voltages of the alternator 12 and similarly, the alternator is protected from large currents that might be absorbed by the load 16.

If the positive terminal of the battery 14 is inadvertently shorted to battery ground and the alternator 12 is driven, current from the alternator immediately flows through the control resistor 30 and the base-emitter circuit of the transistor 28 and again the transistor shunts the gate current to hold the SCR nonconductive and prevent heavy current from flowing through the alternator and the SCR. Thus, the alternator is protected against inadvertent grounding of the positive battery terminal.

If the battery 14 is inadvertently connected with improper or reversed polarity, current flowing from the battery through the control resistor 30 and base-emitter circuit of the transistor 28 also shunts gate current and inhibits operation of the SCR 20 to protect the alternator 12 against heavy current load.

Thus, the regulator rectifier 10 maintains a predetermined charge on the battery 14 and also protects the alternator 12, the load 16 and the rectifier 10 against damage during abnormal battery conditions.

Figure 3:
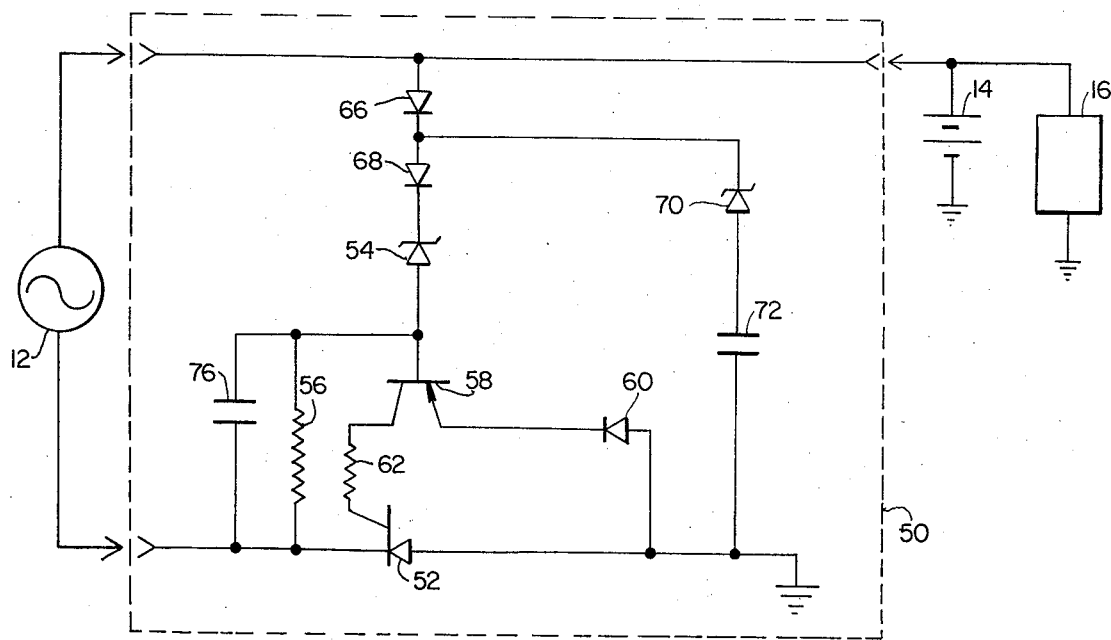
FIG. 3 is an electrical schematic illustrating still another embodiment of the regulator rectifier of the present invention.

FIG. 3 illustrates still another embodiment of the regulator rectifier, generally designated 50, which interconnects the alternator 12 with the battery 14 to maintain a charge on the battery at a regulated voltage level.

Like the rectifier 10, the rectifier 50 utilizes an SCR 52 as a rectifying element between the alternator and battery ground. The control circuitry of the regulated rectifier 50 includes a voltage divider connected across the terminals of the alternator 12 to monitor the output voltage. The voltage divider is comprised primarily of a zener diode 54 and a resistor 56 and defines an output at the junction of the diode and resistor connected with the base of a PNP transistor 58. The transistor 58 has an emitter connected with battery ground through a blocking diode 60 and a collector connected to the control gate of SCR 52 through a limiting resistor 62.

As shown, the transistor 58 serves as a solid state control switch inhibiting conduction of the SCR 52 whenever the battery 14 is at or above its regulated voltage level.

Blocking diodes 66 and 68 prevent reverse current flow through the voltage divider, and like diode 60, protect control circuit components such as the SCR 52 and transistor 58 from large reverse voltages during the negative voltage phase of the alternator output. The diode 66 also prevents discharging of the capacitor 72 during the negative voltage phase. The capacitor 72 and another zener diode 70 connected in series extend between the two diodes 66 and 68 and the ground terminal of the battery. An additional capacitor 76 is connected in parallel with the resistor 56 of the voltage divider.

OPERATION IN FIG. 3

Normally, the SCR is nonconductive at the beginning of the positive voltage phase and as long as the transistor 58 connected to the control gate of the SCR remains nonconductive, the SCR remains inhibited. To charge the battery 14 to its regulated voltage level, the SCR 52 must be rendered conductive.

When the battery 14 is discharged below its regulated voltage level and the alternator voltage exceeds the discharged voltage, a small triggering current flows from the alternator through the battery, back to the alternator through the diode 60, the emitter-base circuit of the transistor 58 and the resistor 56. Such current forward biases the transistor and causes it to conduct and provide a pulse of current to the gate electrode of the SCR. As the voltage of the alternator continues to rise above the discharged voltage of the battery, current flow through the SCR from anode to cathode holds the SCR in the conductive state until the alternator voltage again drops below the discharged voltage of the battery at which point the SCR is reverse biased and turns off. The battery 14 receives additional charging currents during each successive positive voltage phase from the alternator 12 until it is charged to its regulated voltage level.

The voltage divider formed by the zener diode 54 and resistor 56 monitors the alternator voltage and develops a blocking signal on the transistor 58 to inhibit the charging of the battery 14 above the regulated voltage level. The zener diode is selected with a breakdown voltage equal to the preselected regulated voltage of the battery and thus no calibration of the circuitry is needed. When the battery is charged to its regulated voltage level, no current flows through the emitter-base circuit of the transistor 58 due to breakdown of the zener diode 54 as soon as the alternator voltage exceeds the regulated voltage level. A control voltage, therefore, is applied to the base of the transistor 58 to inhibit conduction of the transistor and correspondingly conduction of the SCR 52.

The regulator rectifier 50 is designed to protect the alternator and load 16 in the event that battery 14 is removed from the electrical system when the alternator is driven. The zener diode 70 has a reverse bias breakdown voltage which is greater than the breakdown voltage of the zener diode 54 and thus the capacitor 72 is not normally charged while a battery is in the circuit even through the SCR may become conductive. However, if the battery 14 is removed from the system and the load 16 remains, alternator current can flow through the load and the emitter-base circuit of the transistor 58 to gate the SCR 52 into conduction.

If the load 16 drains the alternator so heavily that the alternator voltage does not exceed the regulated battery voltage then the system is self-regulating. Normally, however, the alternator must have a greater current capacity than the load in order to hold the charge on the battery and, therefore, in the absence of the battery 14, alternator voltage will exceed the regulated voltage by some amount even though the load is in the circuit.

During a positive voltage phase of the alternator when the alternator voltage exceeds the breakdown voltage of zener diode 70 with the battery disconnected, high voltage is applied to the load, and current from the alternator charges the capacitor 72 in addition to operating the load 16. During the following negative voltage phase of the alternator, the SCR 52 is reverse biased and ceases conducting. During the next positive voltage phase of the alternator, current does not flow through the load because the capacitor 72 discharges through the zener diodes 70 and 54, the resistor 56 and the load 16 and establishes a blocking voltage on the base of the transistor 58. Conduction of the SCR 52 is inhibited until the capacitor 72 discharges to the regulated voltage level established by the zener diode 54 at which point the blocking signal from the capacitor is removed from the transistor base. During the next positive voltage phase, the capacitor is recharged, the load receives another pulse of alternator current and the cyclic process is repeated. In this manner the alternator-load system can be operated without the battery 14 and without damage to either the alternator or the load.

It will be understood that depending upon the breakdown voltage of zener diode 70, the load 16 experiences periodic voltages greater than the regulated battery voltage; however, if the load, such as a light, has integrating power dissipation characteristics, it can absorb these periodic voltages and produces a time-averaged power output from the alternator 12. The frequency at which the load receives power and correspondingly the power dissipated is controlled by the RC time constant for the discharging capacitor 72 and the breakdown voltage of the zener diode 70 which determines the initial charge on the capacitor. If the load 16 is comprised of lights, the RC time constant is dominated by the resistor 56.

By chance, the voltage on the discharging capacitor 72 may reach the regulated battery voltage level at a point in time when the alternator voltage is near the terminal portion of its positive phase. In such case, the SCR 52 would be gated into conduction as described above, and the load 16 would receive a spike of alternator current. The load 16 would immediately experience another spike of alternator current during the subsequent positive phase of the alternator output which might possibly damage the load or at least introduce a perturbation into the periodic train of pulses which the load is capable of absorbing.

To prevent the occurrence of two successive current spikes or pulses through the load 16, the capacitor 76 is connected in parallel with the resistor 56 and holds the blocking voltage on the base of the transistor 58 after the capacitor 72 discharges for a brief interval which is generally less than a half cycle of the alternator output. Thus, the capacitor 76 discharges through the resistor 56 and inhibits conduction through the transistor 58 or the SCR 52 until the alternator 12 completes the positive phase of the output. Thus, double spiking of the load is avoided and the load is protected.

Accordingly, a regulator rectifier for a battery charging alternator has been disclosed in several different embodiments which utilize an SCR as the rectifying element and which monitor the output voltage of the alternator to determine whether conduction of the SCR should be permitted to charge the battery. The regulator rectifiers include features which protect components of the rectifier, the alternator, or the load connected to the battery system.

While the present invention has been described in several preferred embodiments, it will be understood that numerous modifications and substitutions can be had without departing from the spirit of the invention. For example, the voltage dividers which monitor the alternator voltages within the regulator rectififers may be replaced with other voltage threshold devices. Similarly, the current responsive transistors utilized to inhibit conduction of the SCR's may be replaced by equivalent switching devices and current sensing elements. Accordingly, the present invention has been described in various embodiments by way of illustration rather than limitation.

I claim:

1. A regulator rectifier for an alternator producing alternate positive and negative voltage waveforms between output terminals connected in a circuit for charging a battery to a regulated battery voltage during the positive waveform comprising:
   a controlled rectifier connected as a rectifying element between one terminal of the alternator and one terminal of the battery;
   control circuit means for controlling forward conduction of the controlled rectifier during the positive waveform of the alternator including controlled switching means having conductive and nonconductive conditions and an alternator voltage tracking circuit;
   the tracking circuit being connected across the alternator terminals to monitor the alternator voltage independently of the battery voltage, and producing a signal tracking the positive voltage waveform of the alternator in the vicinity of the regulated battery voltage,
   the controlled switching means being connected to the tracking circuit and responsive to the tracking signal to switch between conductive and nonconductive states as the alternator voltage reaches the regulated voltage and also connected to a control gate of the controlled rectifier to remove bias from the control gate and prevent conduction of the rectifier unless alternator current flows through the battery before the alternator voltage reaches the regulated battery voltage.

2. A regulator rectifier for an alternator as defined in claim 1 wherein:
   the controlled switching means in the controlling circuit comprises a solid state switch having a control terminal connected to the tracking circuit to receive the signal tracking the alternator voltage.

3. A regulator rectifier for an alternator as defined in claim 1 wherein:
   the controlled rectifier is a silicon controlled rectifier having a cathode and anode in addition to a control gate;
   the controlled switching means includes a controlled switch member connected between the control gate and cathode of the silicon controlled rectifier; and
   the tracking circuit is connected with the switch member to actuate the switch member and establish a shunt through the switch between the control gate and cathode of the silicon controlled rectifier at alternator voltages above the regulated battery voltage.

4. A regulator rectifier as defined in claim 3 wherein:
   the switch member is a transistor having a base terminal connected with the tracking circuit, a collector connected to the control gate of the silicon controlled rectifier and an emitter connected to the cathode of the silicon controlled rectifier.

5. A regulator rectifier as defined in claim 3 wherein:
   the controlled switch member has a current responsive control terminal connected to the tracking circuit; and
   a resistive element is connected between the current responsive control terminal and battery ground.

6. A regulator rectifier for an alternator as defined in claim 1 wherein:
   the controlled rectifier is a silicon controlled rectifier;
   the controlled switching means includes a controlled switch member connected to the control gate of the silicon controlled rectifier; and
   the tracking circuit is connected to the controlled switch member to place the switch member in a conductive state in series with the control gate of the silicon controlled rectifier.

7. A regulator rectifier as defined in claim 1 wherein the tracking circuit is comprised of a voltage divider for connection to the terminals of the alternator with a zener diode having a breakdown voltage selected to place the diode in conduction at the regulated battery voltage.

8. In combination with a battery and a battery charging alternator having a first terminal connecting directly with a first terminal of the battery, the improvement comprising:
   a silicon controlled rectifier connected as a rectifying member between a second terminal of the battery and a second terminal of the alternator to selectively conduct a charging current from the alternator through the battery during one half cycle of the alternator output;
   a controlled switch connected between the gate and cathode electrodes of the silicon controlled rectifier;
   the gate and cathode electrodes of the silicon controlled rectifier also being connected to the terminals of the alternator whereby the silicon controlled rectifier may be biased for conduction by the alternator voltage independently of the battery voltage and be unbiased by the controlled switch; and
   electrical circuit means connected with the alternator terminals and the controlled switch for actuating the switch and unbiasing the silicon controlled rectifier above a preselected alternator voltage.

9. The combination of claim 8 wherein:
the controlled switch is a solid state switch having a control terminal connected to the electrical circuit means.

10. The combination as defined in claim 9 wherein the solid state switch has a current-responsive control terminal and an impedance element connects the control terminal to the second terminal of the battery.

11. The combination as defined in claim 8 wherein:
the electrical circuit means comprises a tracking circuit connected with the terminals of the alternator for monitoring alternator voltage and having an output connected to the controlled switch.

12. The combination as defined in claim 11 wherein the tracking circuit includes a voltage divider connected across the terminals of the alternator and a zener diode connecting the output of the voltage divider to the controlled switch.

13. A half-wave regulator rectifier for charging a battery from a source producing an alternating output voltage comprising:
a silicon controlled rectifier serially connected between one terminal of the source and one terminal of the battery with the anode and cathode forwardly biased during a positive phase of the alternating output voltage for conducting a charging current through the battery, the rectifier also having a control gate gating the rectifier for conduction when a forward bias is present between the gate and cathode; and
regulating means for controlling conduction of the silicon controlled rectifier during each positive phase of the alternating output voltage including voltage monitoring circuit means connected to the source for monitoring the source voltage when the source is both above and below a selected regulated voltage level, and connected to the rectifier for controlling forward bias at the control gate independently of the battery, the circuit means including a controlled switch having conductive and nonconductive conditions and being actuated by the monitored source voltage during each positive phase regardless of the battery voltage as the source voltage reaches the selected regulated voltage level, the switch being operatively connected to the control gate of the silicon controlled rectifier to allow a forward bias to exist at the gate of the silicon controlled rectifier during the portion of each positive phase in which the source voltage is below the regulated voltage level and to remove forward bias from the gate during the portion of each positive phase in which the voltage is above the regulated voltage level.

14. A half-wave regulator rectifier as defined in claim 13 wherein the monitoring circuit means includes a voltage divider connected across the output terminals of the source to monitor the alternating voltage, and
the controlled switch is connected to the output of the voltage divider and to the gate of the silicon controlled rectifier for gating and ungating the rectifier during said positive phase of the alternating output.

15. A half-wave regulator rectifier as defined in claim 14 wherein the controlled switch comprises a transistor having a base and emitter circuit connected between the battery and source to conduct battery charging current below the regulated voltage level, the base connected to the output of the voltage divider to inhibit conduction through the base emitter circuit at alternating voltages above the regulated voltage level.

16. A half-wave rectifier as defined in claim 15 wherein the voltage divider in the monitoring circuit includes a zener diode inhibiting a voltage divider output below the regulated voltage level.

17. A half-wave regulator rectifier as defined in claim 13 wherein the controlled switch included in the monitoring circuit means is connected to the gate of the silicon controlled rectifier to gate the rectifier into conduction when the alternating voltage is below the regulated voltage level and charging current flows.

18. A half-wave regulator rectifier as defined in claim 13 wherein:
the monitoring circuit means includes a voltage divider having a zener diode providing an output from the voltage divider at and above the regulated voltage level and the controlled switch is a PNP transistor having a base connected to receive the voltage divider output, an emitter connected to conduct battery charging current to the base and a collector connected to the gate of the SCR to gate the silicon controlled rectifier into conduction.

19. A half-wave regulator rectifier as defined in claim 18 wherein:
the voltage divider of the monitoring circuit also includes a resistive element connected in series with the zener diode; and
a capacitor and another zener diode serially connected with the capacitor are connected across the zener diode of the voltage divider and the base-emitter circuit of the transistor, the zener in series with the capacitor having a breakdown voltage no less than the zener in the voltage divider.

* * * * *